United States Patent
Nunziata

(10) Patent No.: US 11,978,101 B2
(45) Date of Patent: *May 7, 2024

(54) INTERACTIVE GRAPHICAL USER INTERFACE FOR REVERSE REAL ESTATE SEARCH

(71) Applicant: Resynque, Inc., Lewes, DE (US)

(72) Inventor: Maritsa Christoudias Nunziata, Allendale, NJ (US)

(73) Assignee: Resynque, Inc., Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,676

(22) Filed: Dec. 19, 2022

(65) Prior Publication Data
US 2024/0013271 A1    Jan. 11, 2024

Related U.S. Application Data

(63) Continuation of application No. 17/858,661, filed on Jul. 6, 2022, now Pat. No. 11,562,413.

(51) Int. Cl.
*G06Q 30/0601* (2023.01)
*G06Q 50/16* (2012.01)

(52) U.S. Cl.
CPC ..... *G06Q 30/0619* (2013.01); *G06Q 30/0641* (2013.01); *G06Q 50/16* (2013.01)

(58) Field of Classification Search
CPC ..... G06Q 30/0201–0206; G06Q 30/06; G06Q 30/0601–0643; G06Q 30/0645; G06Q 50/16–167; G06F 3/048; G06F 3/0482; G06F 3/0484–0486
See application file for complete search history.

(56) References Cited

U.S. PATENT DOCUMENTS

| | | |
|---|---|---|
| 2005/0261989 A1 | 11/2005 | Vadon et al. |
| 2014/0279591 A1 | 9/2014 | Trailer |
| 2015/0206216 A1 | 7/2015 | Baumol et al. |
| 2016/0054865 A1 | 2/2016 | Kerr et al. |
| 2016/0162970 A1 | 6/2016 | Ketron |
| 2017/0358043 A1 | 12/2017 | Joynt et al. |
| 2019/0266683 A1 | 8/2019 | Burns |
| 2021/0049677 A1 | 2/2021 | Guan et al. |

(Continued)

OTHER PUBLICATIONS

Realty Scout—Smart System for Real Estate Analysis & Forecasting with Interactive User Interface. 2022 IEEE 7th International conference for Convergence in Technology (I2CT). Pune, India. Apr. 7-9, 2022. (Year: 2022).

(Continued)

*Primary Examiner* — William J Allen
(74) *Attorney, Agent, or Firm* — Patterson + Sheridan, LLP

(57) ABSTRACT

Aspects of the present disclosure perform reverse real estate searches using interactive GUIs. In some embodiments, techniques are provided to dynamically identify potential buyers (or renters) and then output those results in an interactive GUI that permits the searcher (e.g., a seller or agent) to then filter the results or update their search criteria. Further, the GUI can provide the ability for the searcher to contact potential buyers, all while remaining anonymous. Thus, the embodiments herein expand the technical benefits of using GUIs to perform real estate searches initiated by buyers (who can remain anonymous) to sellers and other agents to identify potential buyers or renters.

20 Claims, 9 Drawing Sheets

(56) References Cited

U.S. PATENT DOCUMENTS

2021/0125294 A1  4/2021  Tidwell et al.

OTHER PUBLICATIONS

Realty Plus Online Demonstrates Proven Internet-Based MLS Solution; Fusion MLS to be shown at Florida Association of Realtors Convention. Business Editors/High-Tech Writers FAR Convention and Trade Expo. Business Wire. Aug. 10, 2000. (Year: 2000).

INTERACTIVE GRAPHICAL USER INTERFACE FOR REVERSE REAL ESTATE SEARCH

RELATED APPLICATION

This application is a continuation of U.S. patent application Ser. No. 17/858,661 filed on Jul. 6, 2022, which is incorporated herein by reference in its entirety.

Embodiments of the present disclosure relate to interactive graphical user interfaces (GUIs) for performing reverse real estate searches to identify buyers or renters.

In modern real estate search engines, sellers post their listed real estate (e.g., a home or property) for purchase or rent. Potential buyers or renters then provide search criteria such as geographic boundaries, price range, size of the house, amenities, and the like which are then used to identify listed real estate that match this criteria. The search results are then output on a GUI, which can be part of a website or a software application (e.g., an app).

However, selling a property using these search engines requires the seller to lose anonymity. A seller has to "tell the world" that they are selling their house, and typically provides pictures of the house which then become publicly available. Further, the sellers have very little insight into the buyers who might be interested in acquiring the seller's house. A search engine can track how many people viewed the seller's listing, saved the seller's listing, or generated a search that included the seller's listing but that does not mean those people are actually buyers. They could be real estate agents or simply people who are curious. Thus, while buyers can remain anonymous until they place an offer on a property, sellers cannot. Moreover, there is a wide gap between the information a buyer can obtain about a seller versus the amount of information a seller can obtain about a potential buyer.

SUMMARY

According to one embodiment presented in this disclosure, a method is provided. The method includes: receiving a plurality of profiles for buyers interested in acquiring physical properties where the plurality of profiles each indicate a geographic region of interest, a purchasing power of a respective buyer and a closing attribute of the respective buyer, receiving a seller profile using an application programming interface (API), the seller profile comprising a desired sell price range from an owner of a physical property and a closing requirement for closing on a sale of the physical property, receiving a search area from the owner of the physical property where the search area defines a geographic region that includes the physical property, determining a subset of the plurality of profiles that have geographic regions of interests that at least partially overlap the search area, determining which of the subset of the plurality of profiles have closing attributes that satisfy the closing requirement in the seller profile and have purchasing powers that are within the desired sell price range, outputting search results in an interactive graphical user interface (GUI) based on determining the subset of the plurality of profiles that satisfy the closing requirement and have purchasing powers that are within the desired sell price range where the search results indicate which of the buyers are potentially interested in acquiring the physical property where the interactive GUI comprises a filtering input/output (I/O) element enabling selection of one or more filtering options, receiving, after outputting the search results, selection of one or more filtering options using the filtering I/O element, and updating, in real-time, the search results in the interactive GUI in response to receiving the selection of the one or more filtering options by filtering the subset of the plurality of profiles that satisfy the closing requirement and have purchasing powers that are within the desired sell price range.

Another embodiment presented in this disclosure is a method that includes receiving a plurality of profiles for buyers interested in acquiring physical properties where the plurality of profiles each indicate a geographic region of interest and a purchasing power of a respective buyer, receiving a desired sell price range from an owner of a physical property using an application programming interface (API) where the API prevents the owner from identifying a maximum purchasing power of one of the buyers by permitting the owner to input the desired sell price range using only a fixed list of different price ranges, receiving a search area from the owner of the physical property, determining a subset of the plurality of profiles that have geographic regions of interests that at least partially overlap the search area, determining which of the subset of the plurality of profiles have purchasing powers that are within the desired sell price range, outputting search results in an interactive graphical user interface (GUI) based on determining the subset of the plurality of profiles that have purchasing powers that are within the desired sell price range where the interactive GUI comprises a filtering input/output (I/O) element enabling selection of one or more filtering options, receiving, after outputting the search results, selection of one or more filtering options using the filtering I/O element, and updating, in real-time, the search results in the interactive GUI in response to receiving the selection of the one or more filtering options by filtering the subset of the plurality of profiles that have purchasing powers that are within the desired sell price range.

Another embodiment presented in this disclosure is a method that includes receiving a plurality of profiles for buyers interested in acquiring physical properties, wherein the plurality of profiles each indicate a geographic region of interest and a purchasing power of a respective buyer, receiving a desired sell price range from an owner of a physical property using an application programming interface (API) where the API prevents the owner from identifying a maximum purchasing power of one of the buyers by requiring the owner to input the desired sell price range to satisfy a minimum size threshold, receiving a search area from the owner of the physical property, determining a subset of the plurality of profiles that have geographic regions of interests that at least partially overlap the search area, determining which of the subset of the plurality of profiles have purchasing powers that are within the desired sell price range, outputting search results in an interactive graphical user interface (GUI) based on determining the subset of the plurality of profiles that have purchasing powers that are within the desired sell price range where the interactive GUI comprises a filtering input/output (I/O) element enabling selection of one or more filtering options, receiving, after outputting the search results, selection of one or more filtering options using the filtering I/O element, and updating, in real-time, the search results in the interactive GUI in response to receiving the selection of the one or more filtering options by filtering the subset of the plurality of profiles that have purchasing powers that are within the desired sell price range.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
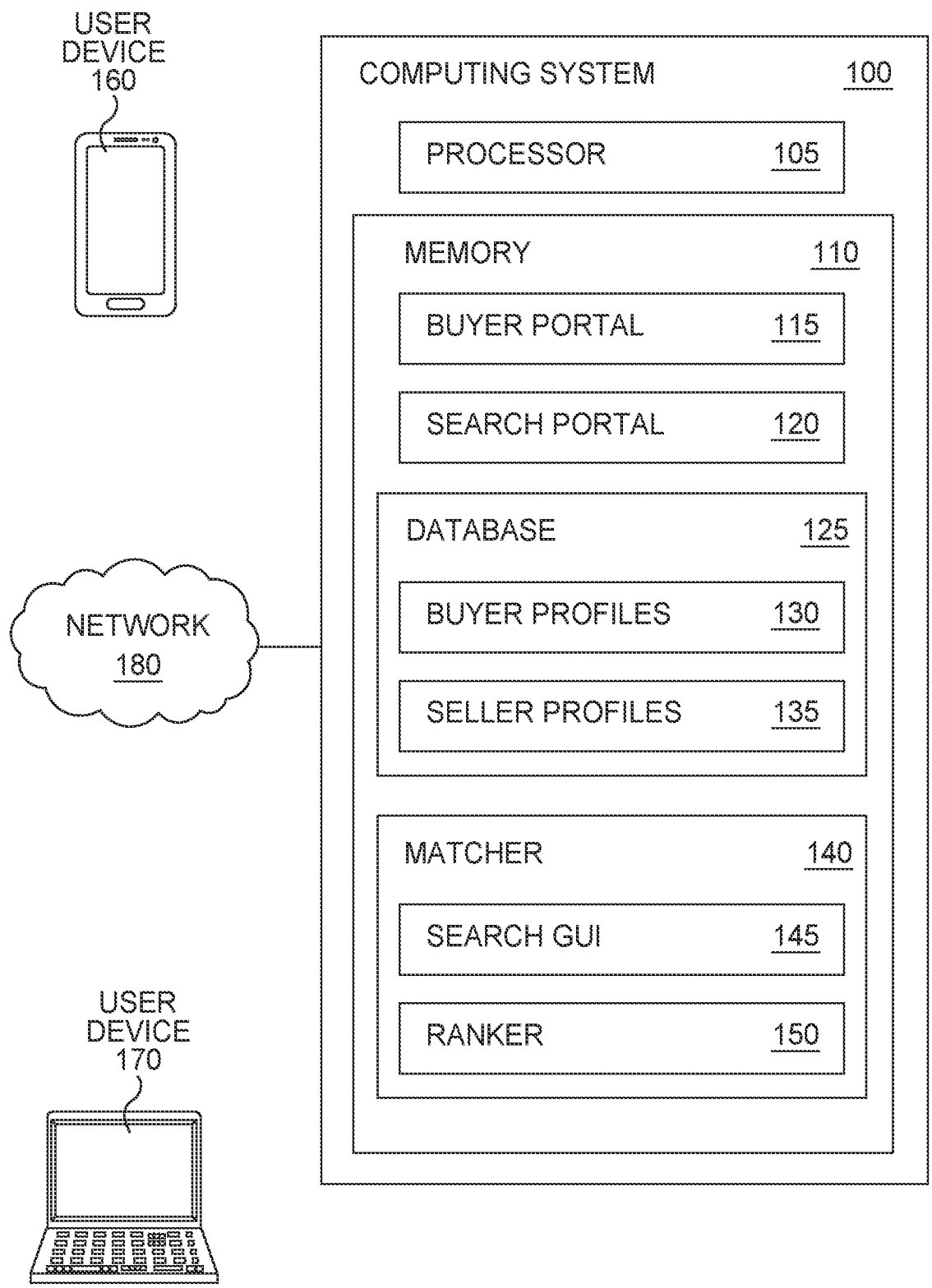
FIG. 1 depicts an example environment for reverse real estate searches using interactive GUIs, according one embodiment.

Aspects of the present disclosure provide apparatuses, methods, processing systems, and computer-readable mediums for performing reverse real estate searches using interactive GUIs. In some embodiments, techniques are provided to dynamically identify potential buyers or renters (referred to generally as clients) and then output those results in an interactive GUI that permits the searcher (e.g., a seller or agent) to then filter the results or update their search criteria. Further, the GUI can provide the ability for the searcher to contact the buyer, all while remaining anonymous. Thus, the embodiments herein expand the technical benefits of using GUIs to perform real estate searches initiated by buyers (who can remain anonymous) to sellers and other agents to identify potential buyers. This capability significantly improves the functionality of the computing systems themselves, at least by enabling new and more efficient digital searches and interactions, as compared to conventional computing systems.

In the examples discussed below, real estate transactions are discussed as example environments where aspects of the present disclosure can provide improved computational efficiency through interactive GUIs. However, aspects of the present disclosure are readily applicable to a wide variety of other transactions such as selling vehicles (cars, recreational vehicles, or watercraft), fresh produce, handmade crafts, and the like where the seller can remain anonymous until contacting a potential buyer.

In one embodiment, a computing system provides a buyer portal where a buyer can generate a buyer profile that describes what type of property they would like to purchase or rent (e.g., size of the house or apartment, number of baths, pool, etc.), the desired area (e.g., street, county, school district, or state), and purchasing power. The computing system can also provide a search portal where a searcher can provide search criteria used to identify buyers who have buyer profiles that match at least one of the search criteria. The computing system can then generate a GUI that is output on the searcher's user device that contains the search results. The searcher can then interact with the GUI by choosing to contact a buyer, filtering the buyers, updating the search criteria, and the like.

In one embodiment, the searcher can be a property owner (i.e., a seller) who would like to remain anonymous. The seller can use the search portal to generate a seller profile which can then be used as search criteria to identify buyers with profiles that match the seller profile. Advantageously, the seller can remain anonymous until the point she contacts a buyer, and even then, the seller can control how much information she provides the buyer. In this manner, the technical advantages of using interactive GUIs by buyers when searching for physical properties can be extended to sellers. For example, additional and useful data (which is not otherwise available to sellers in conventional systems) may be surfaced and output to sellers rapidly, thereby providing improved data transparency with efficient use of computational resources.

In addition, the computing system can rank the search results by identifying similarities between the search criteria and the matching buyer profiles. Buyer profiles that are more similar to the search criteria are assigned higher ranks and are arranged in the interactive GUI accordingly. For example, the higher ranked buyer profiles may be moved to the top of the GUI. In this manner, the embodiments herein can automatically move the buyer profiles that are likely to be of most interest to the user to a prominent location in the GUI. This may further reduce the computational expense of generating and providing interaction with the GUI. For example, because the profiles that are most likely of interest are positioned more prominently, the selling user is less likely to need to conduct further searches, filtering, or other operations. This reduces the overall computational burden on the computing system.

FIG. 1 depicts an example environment for reverse real estate searches using interactive GUIs, according one embodiment. FIG. 1 includes a computing system 100 that is communicatively coupled to user device 160 and user device 170 via a network 180 (e.g., the Internet). The computing system 100 can be a single computing device (as discussed in more detail in FIG. 9) or can be multiple computing devices that are communicatively coupled. For example, the computing system 100 may be a data center or computing resources provided by a cloud service provider.

The computing system 100 includes at least one processor 105 which represents any number of processing elements that can each include any number of cores. The computing system 100 also includes a memory 110 which can be volatile memory, non-volatile memory, and combinations thereof. In this example, the memory 110 includes a buyer portal 115, a search portal 120, a database 125, and a matcher 140.

The buyer portal 115 is an interface such as an application programming interface (API) that permits the user device of the buyer to communicate with the computing system 100. For example, the buyer may use the user device 160 to communicate with the buyer portal 115 via the network 180. As described in more detail below, the buyer can provide information to the buyer portal 115 which can be used to generate a buyer profile 130 stored in the database 125. The buyer profile 130 can include information such as the geographical region the buyer is looking, desired home size, desired amenities, and purchasing power. While the embodiments primarily describe performing a reverse real estate search where a searcher searches for relevant buyers, the computing system 100 can also support the typical real estate search where a buyer searches for relevant seller listings.

The search portal 120 is an interface such as an API that permits the user device of the searcher to communicate with the computing system 100. For example, the searcher may use the user device 170 to communicate with the search portal 120 using the network 180. In one embodiment, the searcher may be an agent who is performing market research to determine how many buyers are interested in a particular geographical location or search area. In that case, the searcher is a not a seller, but nonetheless can use the embodiments described herein to perform a reverse real estate search. In this scenario, the searcher may use attributes from a made-up or hypothetical home to perform the search. The searcher can provide search criteria that the matcher 140 can use to identify matching buyer profiles 130 stored in the database 125, such as a desired price, number of bedrooms, number of baths, etc. of a hypothetical physical property.

In another embodiment, the searcher is a seller who may have currently listed a property or is only considering listing her property. The seller can provide search criteria used by the matcher 140 to identify matching buyer profiles 130 in the database 125. In one embodiment, the seller can use the search portal 120 to provide information for generating a seller profile 135 for a real physical property (e.g., a house the seller currently owns). The seller profile 135 can include information such as the address of the house, size of a house, amenities on the property, minimum price the seller is willing to accept, buyer requirements (e.g., the buyer must be preapproved, waive inspection, no contingencies, etc.), condition of the house, and the like. In one example, the matcher 140 can use the seller profile 135 as the search criteria for searching the buyer profiles 130 to identify matching buyers.

The matcher 140 (e.g., a software application) includes a search GUI 145 (e.g., an interactive GUI) and a ranker 150. The search GUI 145 can display the buyer profiles 130 that match the search criteria provided by the searcher via the search portal 120. The computing system 100 can cause the search GUI 145 to be displayed on the user device used by the searcher (e.g., the user device 160 or 170). For example, the user device can use an app or a web browser to view the GUI 145 that has the search results. The details of the GUI 145 and the different ways the searcher can interact with the GUI 145 are discussed below.

The ranker 150 (e.g., a software application) can rank the search results according to the similarities of the buyer profiles 130 with the search criteria. Buyer profiles 130 with more similarities with the search criteria provided by the searcher are assigned higher ranks by the ranker 150. In response, the matcher 140 can arrange the search results in the GUI 145 so that the higher ranked buyer profiles 130 are displayed more predominantly in the GUI 145.

FIG. 1 illustrates just two examples of suitable user devices—e.g., a smartphone and laptop. Other user devices can be a desktop computer, tablet, and the like. In general, the user device can include any device that includes a display for displaying the search GUI 145 and permits the buyer and searcher to interact with the buyer portal 115 and the search portal 120, respectively.

Figure 2:
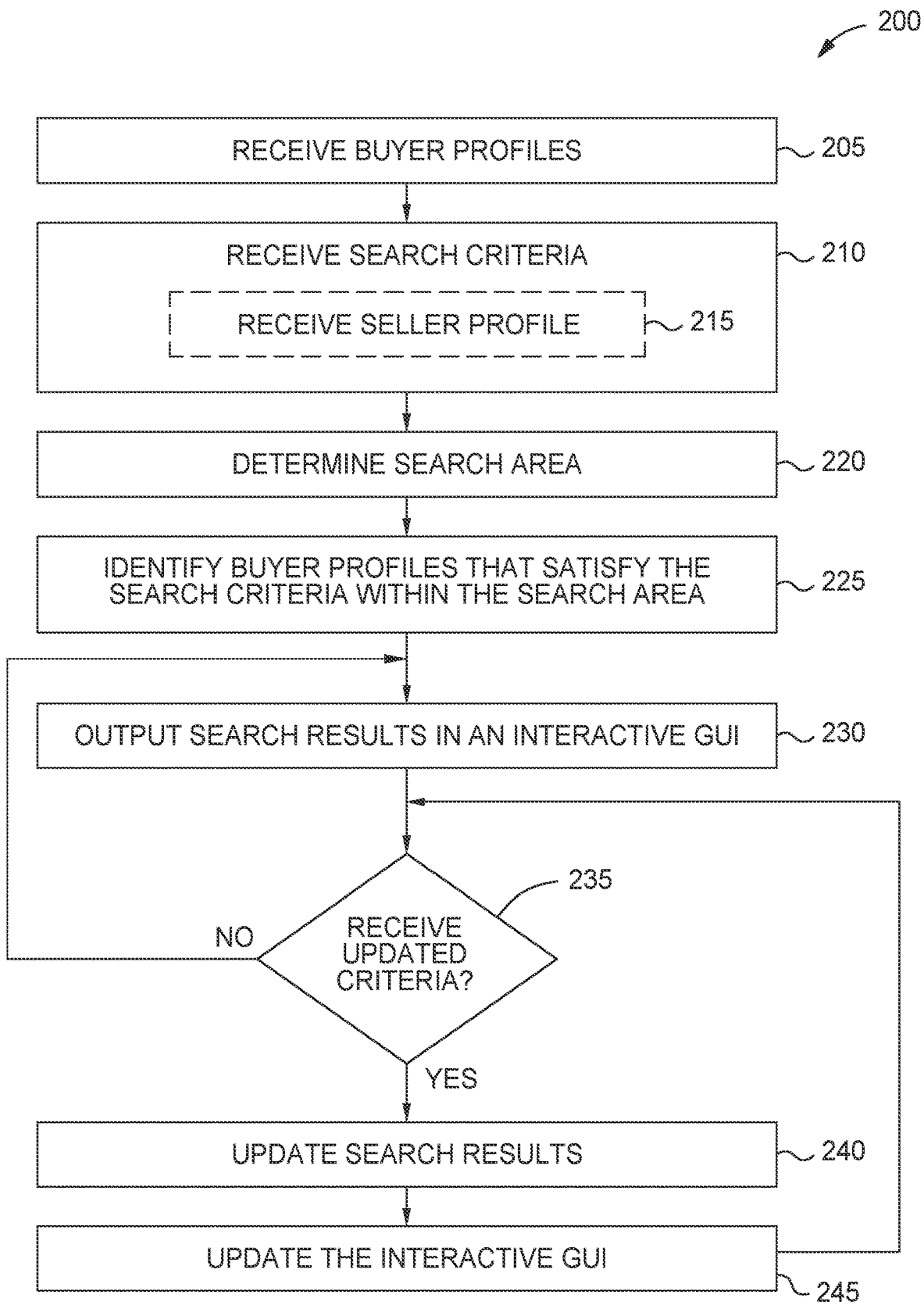
FIG. 2 is a flowchart for performing reverse real estate searches using in interactive GUI, according one embodiment.

FIG. 2 is a flowchart of a method 200 for performing reverse real estate searches using an interactive GUI, according to one embodiment. At block 205, the buyer portal (e.g., the buyer portal 115 in FIG. 1) receives buyer profiles (e.g., the buyer profiles 130 in FIG. 1) from multiple buyers. For example, a buyer may want to purchase or rent a house or apartment in a particular neighborhood, county, state, school district, city, etc. The buyer can use the buyer portal to create a buyer profile that is stored in a database (e.g., the database 125 in FIG. 1).

In one embodiment, the buyer portal can provide a GUI (or a series of GUIs) that provide input/output (I/O) elements (e.g., text fields, radio buttons, drop down menus, etc.) that the buyer can use to provide information to populate a buyer profile. If the buyer is interested in purchasing a house, the buyer profile can include information such as desired location, desired house features, desired home condition, and the buyer's purchasing power. The desired location can be expressed geographically such as state, county, zip code, city/town/municipality, street, etc. or amenity related such as school district, country club, distance to work or public transportation, etc. The desired house features can include home type (e.g., single family, condominium, multi-family, or mixed use), number of beds or baths, garage, pool, fenced in backyard, handicap accessible, and the like. The desired home condition can be recently upgraded, move-in ready, or fixer upper. The purchasing power can include pre-approved financing, cash with proof of funds, flexible closing date, and whether or not the buyer can close quickly (no contingency on selling current home). The buyer profile can also indicate whether the buyer has an agent.

In one embodiment, the buyer portal can receive thousands or millions of buyer profiles. These profiles can be stored in the database so they can be searched. Moreover, the buyer profiles can be removed when a buyer purchases a property or stops looking. For example, the buyer profiles may have to be actively renewed by the buyer after a predefined time period (e.g., three months) or they are automatically deleted from the database. In some embodiments, such active and automatic maintenance of the database (by culling inactive buyers) can allow the system to operate with reduced computational needs (e.g., reduced storage needs).

At block 210, the searcher portal receives search criteria used to search the buyer profiles. In one embodiment, the searcher is a person doing market research to determine, for example, how many buyers are looking to purchase or rent a hypothetical physical property in a particular area, or to determine the types of homes most buyers are interested in. Thus, some searchers may not be sellers or renters. In that case, the search portal can provide a GUI (or a series of GUIs) that provide I/O elements that the searcher can use to provide the search criteria. The search criteria can include a geographic location, home features, and home condition, and buyer requirements (e.g., the buyers' purchasing power). For example, the searcher may be looking to identify how many buyers, have pre-approved financing and are looking for a home in a particular country that has at least 3 bedrooms and 2 bathrooms and is move in ready.

If the searcher is someone who is, or is looking to, sell or rent real estate, the method 200 can perform optional block 215 (shown in dotted lines) where the searcher portal receives a seller profile from the seller/landlord. The seller profile can include such information as the a geographical area around the house, features in the house, the condition of the home, and buyer requirements (e.g., the buyers' purchasing power). For example, the seller may only be interested in cash buyers, or buyers that do not have a contingency on selling their current homes. This is all information that can be put in the seller profile.

At block 220, the matcher (e.g., the matcher 140 in FIG. 1) determines a search area. This can be provided by the searcher, or could be in the seller profile. For example, the searcher may want to search for buyers looking in a particular geographic area such as a county or city. Or the searcher may use a GUI to draw a search area in a displayed map using a touch display.

Figure 3:
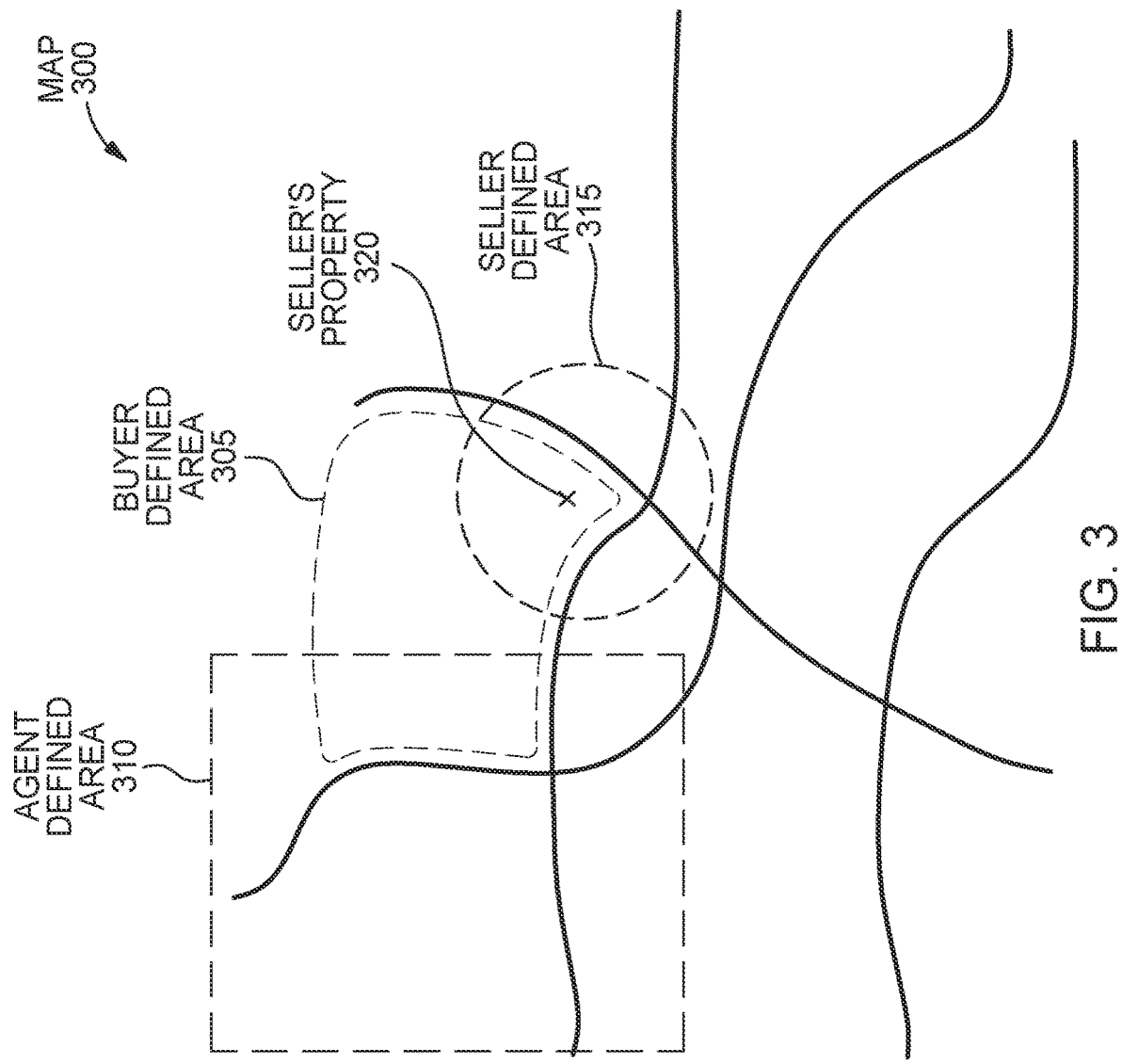
FIG. 3 illustrates buyer, seller, and agent defined areas for performing a reverse real estate search, according one embodiment.

FIG. 3 illustrates buyer, seller, and agent defined areas for performing a reverse real estate search, according one embodiment. FIG. 3 includes a map 300 that includes a buyer defined area 305, an agent defined area 310, and a seller defined area 315. The buyer defined area 305 may have been determined at block 205 of method 200 when the buyer filled out the buyer profile. For example, the buyer defined area 305 in FIG. 3 may be a particular city or a school district.

The agent defined area 310 may be defined by an agent who is doing market research using attributes of a hypothetical house (i.e., a hypothetical physical property that the agent does not own). The agent may have defined this area 310 at block 210 of the method 200. In this case, the agent defined area 310 and the buyer defined area 305 at least partially overlap. Thus, the matcher will consider the buyer defined area as a potential match for search being performed by the agent. However, if the buyer defined area 305 did not overlap with the agent defined area 310, this the buyer would not be considered as a match to the search being performed by the agent.

The seller defined area 315 can be defined in the seller profile completed at block 215 of the method 200. In this example, the seller defined area 315 is a circle centered at the location of the seller's property 320 (i.e., a real physical property). As shown, the seller defined area 315 also partially overlaps with the buyer defined area 305. Thus, the matcher will consider the buyer defined area 305 as a potential match for the search being performed by the seller. In other embodiments, the seller defined area 315 may be the location or address of the seller's property 320. That is, the searcher may want to see how many buyer defined areas 305 include the exact location of the seller's property 320.

FIG. 3 illustrates how the matcher can plot the areas defined by the buyers with the areas defined by a searcher (e.g., an agent or a seller) to determine whether a buyer is a potential match for a search. In one embodiment, the matcher only considers a buyer as a potential match if the buyer defined area 305 at least partially overlaps with the search area (e.g., the agent and seller defined areas 310 and 315). That is, the overlap between the areas can be used to identify a subset of the buyer profiles to search. This dynamic identification of the relevant subset of buyer profiles to search can reduce the computational resources needed to perform embodiments of the present disclosure. For example, rather than searching and thoroughly evaluating all of the relevant characteristics of all buyers profiles (which may number in the thousands or millions), the system can quickly identify the subset of relevant buyer profiles (which may be significantly smaller) based on a single data item: the defined areas. In this way, the subset can be identified or generated more efficiently and with reduced latency, as compared to performing a full analysis of each buyer profile (e.g., to determine how well-matched the buyer is with respect to the seller). Further, evaluating this subset of potential buyer profiles generally requires reduced expense, as compared to evaluating all possible buyers.

Returning to the method 200 in FIG. 2, at block 225 the matcher identifies buyer profiles that satisfy the search criteria within the search area. As an initial step, the matcher may identify the buyer profiles that have a geographic area that at least partially overlaps the search area, which was discussed in FIG. 3. These buyer profiles can then serve as candidate buyer profiles which the matcher can then evaluate to determine whether they match the other search criteria. For example, the searcher criteria may indicate that the buyers must be a cash purchaser and be looking for a house with at least three bedrooms and a pool. The search criteria can also include a desired price.

The matcher can parse the buyer profiles in the database within the search area to find buyer profiles that include these criteria. In one embodiment, the matcher may look for buyer profiles that exactly match the search criteria. For example, if the search criteria says four bedrooms, only buyer profiles that indicate they are looking for four bedrooms (not three or not five) will match. Alternatively, the matcher may search for buyer profiles that at least satisfy the search criteria (e.g., the search criteria indicates four bedrooms which can match to buyer profiles where the buyer wants four, three, two, or one bedrooms). For example, when generating the buyer profiles, the buyers may indicate they are looking for a house that has at least three bedrooms, but would also be interested in homes that have four, five, or more bedrooms. Thus, these buyer profiles can still match a search for buyers who are interested in a home with four bedrooms.

Further, the buyer profiles can include a price range that indicates the price the buyer is willing to pay, or a price the buyer is preapproved for. The matcher can then determine whether the price in the search criteria is within the price range specified by the buyer. If so, this can indicate the buyer is a match (assuming the other criteria are also satisfied).

In one embodiment, the search criteria can have certain criteria that are required and other requirements that are optional. For example, the searcher may indicate the buyer must be looking for a home with three bedrooms and two bath at a certain price, but that it is optional that the buyer be preapproved or can offer quick closing. Thus, buyers who are not preapproved can still match the search if they have the required search criteria in their profile. In one embodiment, the buyers can be ranked according to the similarities between their profiles and the search criteria, which is discussed later in FIGS. 6 and 7.

At block 230, the matcher outputs search results in an interactive GUI (e.g., the search GUI 145 in FIG. 1). The matcher can output the GUI to the user device for the searcher. As discussed in more detail below, the GUI can display information regarding the buyers that matched the search criteria. Thus, the method 200 can be used to expand the technological advantages provided by GUIs to performing reverse real estate searches. In addition to displaying the search results, the GUIs can be interactive so that the searcher can change the search criteria on the fly and receive updated search results.

At block 235, the matcher determines whether the searcher has provided updated search criteria. In one embodiment, the GUI can provide interactive elements (e.g., buttons, menus, text fields, etc.) the searcher can use to filter and change the search results. For example, the searcher can use the interactive elements to update or change the search results. After viewing the search results, the searcher may choose to change the search criteria by, e.g., changing the number of bedrooms or the desired selling price.

If the searcher has provided updated search criteria, the method 200 proceeds to block 240 where the matcher updates the search results. For example, the matcher can repeat block 225 to identify which of the buyer profiles match the updated search criteria. The updated search criteria may increase the number of search results (e.g., if the searcher reduces the desired selling price) or decrease the number of search results (e.g., if the searcher limits the buyers to only those who can close within 30 days).

At block 245, the matcher updates the interactive GUI. That is, the GUI can display updated search results in response to the updated search criteria. In this manner, instead of using GUIs for searching for properties for sale or rent, the embodiments herein provide interactive GUIs for agents, sellers, and the like to search for prospective buyers or renters. In this manner, the technological advantages provided by GUIs can be leveraged to perform reverse real estate searches. Further, the GUIs can be interactive so that updated search criteria can be received from the searchers and used to provide real time updates to the search results.

Figure 4:
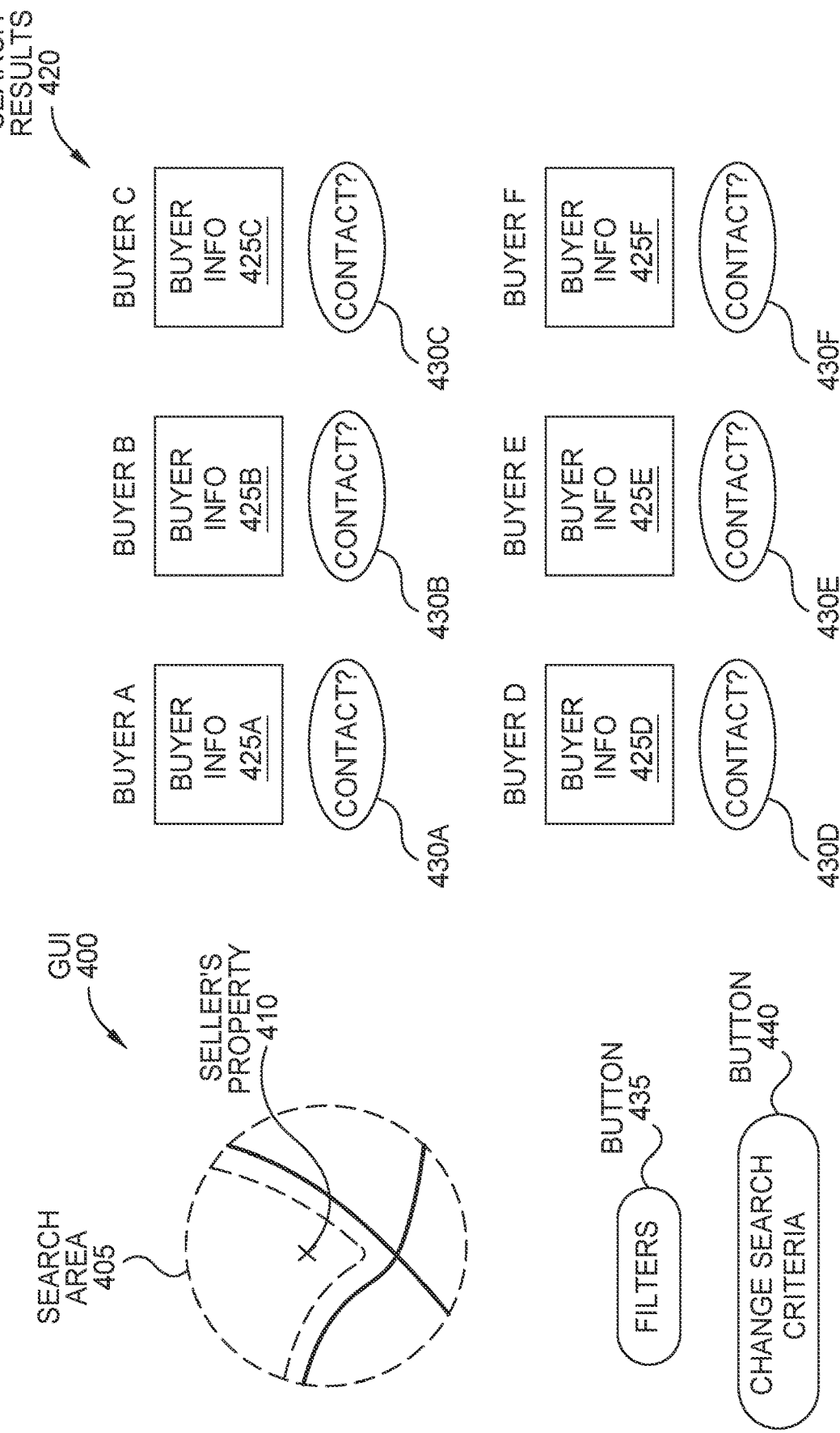
FIG. 4 is an interactive GUI, according one embodiment.

FIG. 4 is an interactive GUI 400, according one embodiments. The GUI 400 includes a search area 405, search results 420, and buttons 435 and 440. The search area 405 indicates the geographic region that was provided by the searcher. In this example, the searcher is a seller who selected a search area 405 that has a desired radius (e.g., 10 miles) around the location of the seller's property 410. In other embodiments, the search area 405 may not be based on the location of a property if, for example, the searcher is an agent doing market research on the number of buyers interested in a particular search area 405.

The search results 420 display a list of the buyers who have buyer profiles that matched the search criteria provided by the searcher. In this case there are six buyers (Buyers A-F) who have buyer profiles that match the search criteria. In one embodiment, the names of the buyers may be anonymized. For example, the buyers may be represented by random number, initials, buyer selected usernames, and the like. The buyers may choose whether to remain anonymous when generating their buyer profiles. In contrast, some buyers may wish to provide a picture and use their real name since it might convey to sellers that they are strongly interested in purchasing a home, thereby increasing the likelihood a seller will choose to contact them.

The search results 420 also display buyer information (info) 425. The buyer info 425 may include some of the information in the buyer profile such as the number of bedrooms they are looking for, whether they want a fixer-upper, the geographic location they are interested in, and the like. In one embodiment, to conserve space in the GUI 400, the buyer info 425 is displayed only after a prompt from the searcher. For example, the searcher may have to first click or touch the buyer profile before the GUI 400 is update to display the buyer information 425. This can improve the accessibility and readability of the GUI 400 as well as potentially reducing network traffic and conserving bandwidth since the system may wait to transmit the buyer information 425 to the searcher's user device until the searcher clicks on the corresponding buyer profile.

In some embodiments, the buyer info 425 may list all of the information in the buyer profile (or provide a link the seller can click or touch to open another GUI listing all the information in the buyer profile). However, in one embodiment, the buyer info 425 may not include the price range provided by the buyer since this could provide an unfair advantage to the seller since they know the price the buyer is willing to pay. If the searcher provided a desired sale price for her home, by virtue of the buyer being identified in the search results 420, the seller can know the buyer has a range that includes the desired sell price of the seller. Alternatively, the buyer profiles may not include the price range of the buyer (or not permit the searcher to search using a desired sale price). That way, the seller cannot increase the desired price incrementally to identify the top price buyers is willing to pay for a house. In this case, the searcher can use other metrics to represent the purchasing power of the buyer such as preapproval, cash purchases, quick closing, etc.

In another embodiment, to prevent the seller from identifying the top price buyers are willing to pay, the searcher portal may require the seller to limit their asking price to a range only. For example, the seller may be unable to search using a specific sell price—e.g., $765,000—for their home, only that they want the sell price to be in the "$700,000-$800,000" range. The search portal could require that the range have a minimum size—e.g., $100,000—or have predefined ranges that the seller selects from (i.e., the seller cannot input her own range). Or the search portal can automatically convert the seller's asking price into a range. This seller can change the range of the sell price to see which range has the most buyers. For example, if a buyer's profile includes a capped pre-approval amount (e.g., $850,000 maximum), the buyer could set an option in the profile so that sellers with a price range equal to, or 20% less than, that capped number would match. So sellers that search using an asking price range of $600,000-$700,000, $700,000-$800,000 or $800,000-$900,000 would all see this one buyer. This buyer would "disappear" when the seller selects "$900,000-$1,000,000", but other buyers in that range would appear, and it becomes a different pool of buyers. Thus, the buyer can control what asking price ranges provided by a seller matches the buyer's pre-approval amount.

The search results 420 also include a button 430 for each buyer which the searcher can click or press to contact the buyer. By activating the button 430, the searcher can contact the buyer by text, email, automated message, etc. In one embodiment, the seller can control what information she provides to the buyer. That is, the seller can still remain anonymous if she choose when contacting a buyer by not providing the address of the home or showing any pictures. For example, the seller may first wish to gauge interest of the buyer by asking if she is interested in a home in a particular neighborhood or street. The seller may also disclose her desired price. If the buyer responds that she is interested, the seller can then provide more information and schedule a showing, or ask to contact the buyer's real estate agent. In this manner, a seller can remain anonymous even after contacting a buyer.

The button 430 is just one example of a suitable I/O element that can be used to contact a buyer. Other examples can include a menu where the searcher can select predefined messages to send to the buyer, or a text field where the searcher can directly draft a message to the buyer.

While GUI 400 arranges the search results 420 in a grid, this is just one example. The search results 420 can be arranged in a list, in a window with a scroll bar, and the like. Further, as discussed below, the search results 420 may be assigned a rank based on similarities with the search criteria, where higher ranked buyers are displayed more predominantly on the GUI 400. In one embodiment, to conserve bandwidth, the system may initially transmit only the higher ranked buyers to be displayed on the GUI 400. After reviewing the profiles for these buyers, the searcher can then instruct the system to update the GUI 400 to display lower ranked buyers. In this manner, the GUI 400 can be updated piecemeal to display all the matched search results, starting with the higher ranked buyers first, which can conserve computational resources.

The button 435 permits the searcher to filter the search results. Filtering the search results can avoid performing a new search, which may take a longer amount of time than simply filtering the already identified search results. For example, based on the search criteria, the GUI 400 may display a hundred buyers. This may be too large of a group for the searcher to contact. The searcher can then use the filter button 435 to filter the search results 420. For example, the searcher may raise the desired price, require the buyers to be preapproved, or shrink the search area 405. In this manner, the filter button 435 is a tool in the interactive GUI 400 the searcher can use to filter and reduce the search results.

As one example, if the searcher is a seller, the matcher may perform an initial search using the information in the seller's profile as the search criteria. These results are then displayed as the search results 420. The seller can then use the filter button 435 to filter those initial search results 420.

In another embodiment, the filter button 435 can also be used to rearrange the order the buyers are displayed in the search results 420 but not remove any of the buyers from the search results 420. The searcher may desire to display the preapproved buyers first, or those who have information in their profiles that exactly match the search criteria (or the information in the seller's profile) may be filtered to be at the top of the search results 420.

The button 440 permits the searcher to change the search criteria. Unlike filtering the search results, changing the search criteria instructs the matcher to perform a new search. For example, the searcher can use the button 440 to increase the search area or remove one of the search criteria. Or the searcher may choose to remove one search criteria but add another. Instead of filtering the results, changing the search criteria causes the matcher to repeat the search as discussed in the method 200, which may take longer than simply filtering the already identified search results 420. In either case, the matcher can update the GUI 400 to display updated search results 420 in response to the searcher interacting with the GUI 400.

While GUI 400 displays using buttons 435 and 440 to update the search results 420, other types of I/O elements can be used such as drop down lists, radio buttons (used to select and deselect different search criteria), text fields used to input search criteria, and the like. Further, the buttons 435 and 440 may open up a pop-up or other window which the searcher can use to change or filter the search results 420.

Figure 5:
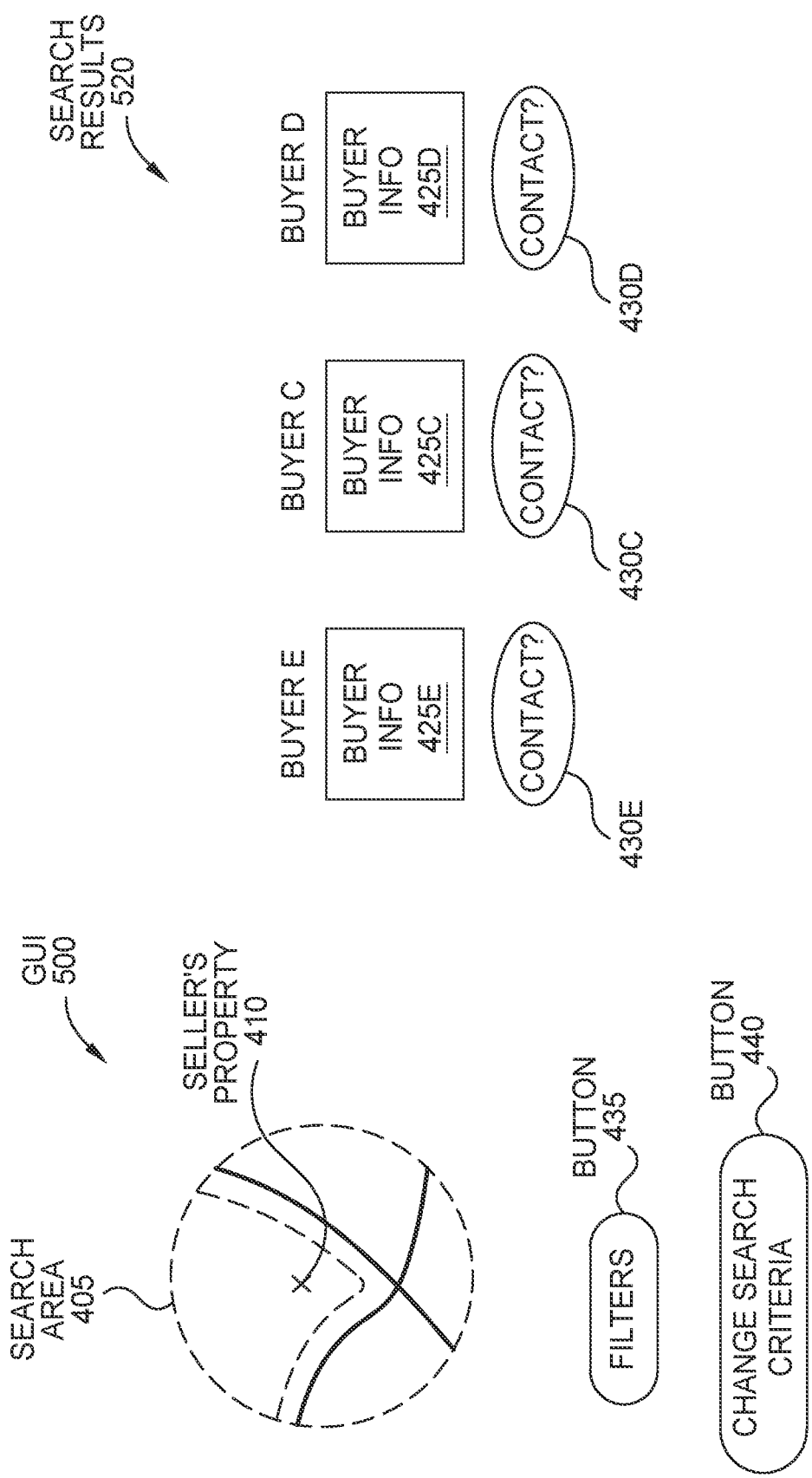
FIG. 5 is an interactive GUI, according one embodiment.

FIG. 5 is an interactive GUI 500, according one embodiment. In one embodiment, the GUI 500 illustrates using the buttons 435 or 440 to update or filter the search results 420 in the GUI 400 in FIG. 4. For example, the searcher may have added a new search criteria, changed a current search criteria, or a combination of both. In response, the matcher filters the current search results, or performs a new search, and displays the new search results 520 in the GUI 500. Thus, the only thing that has changed between the GUIs in FIGS. 4 and 5 is the search results 520.

In this example, the searcher has shrunk the search results 520 relative to the search results 420 so there are now only three buyers who have buyer profiles that match the search criteria. For example, the searcher may have added as a search criteria that the buyers must be cash buyers and only Buyers E, C, and D qualify. Or the searcher may have shrunk the search area and only Buyers E, C, and D have geographical locations that overlap with this reduced search area. In this manner, the interactions of the searcher with the GUI (e.g., changing the search criteria) can then update the search results displayed by the GUI.

Figure 6:
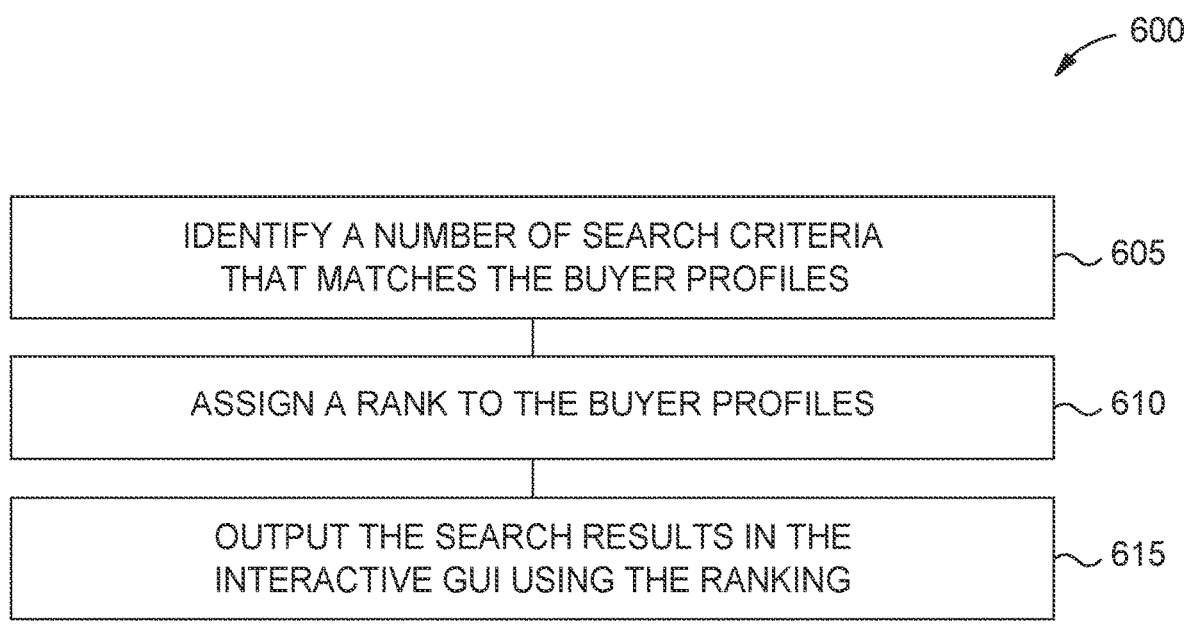
FIG. 6 is a flowchart for ranking search results, according one embodiment.

FIG. 6 is a flowchart of a method 600 for ranking search results, according one embodiment. At block 605, the ranker (e.g., the ranker 150 in FIG. 1) identifies a number of search criteria that matches the buyer profiles. In one embodiment, to include a buyer as part of the search results, the buyer profile has to match a certain percentage or threshold number of the search criteria. Any buyer profile that satisfies the percentage or threshold number of the search criteria is added to the search results, but profiles that match more than just the minimum percentage or threshold are assigned higher ranks.

In another example, the search criteria distinguishes between criteria that are required in order for a buyer profile to match the search (e.g., overlapping geographic regions) and other search criteria that are optional (e.g., the seller has a pool and the buyer may have, or may not have, indicated in her profile whether she wants a pool). In this example, for a buyer to be included in the search results, the buyer profile must have the required search criteria but does not have to have the optional search criteria. Nonetheless, buyer profiles that also satisfy the optional search requirements can be given a higher rank. The ranker can assign higher ranks as the buyer profiles match more of the optional search criteria.

In another embodiment, the ranker ranks buyers depending on whether their buyer profiles exactly match the search criteria. For example, if the buyer profile indicates the buyer is looking for a three bedroom home but the search criteria indicates the seller has a four bedroom home, the buyer may still be included in the search results (e.g., the buyer may prefer a three bedroom home but is still interested in a four bedroom home). This buyer may be assigned a lower rank than a buyer with a profile indicating they are looking for a four bedroom home.

At block 610, the ranker assigns a rank to the buyer profiles in the search results. In one embodiment, the rank may be unique to each buyer so that each buyer has a different rank, or the rank may have different levels (low, medium, or high, or one star, two stars, three stars, etc.) where multiple buyers can have the same rank.

At block 615, the matcher outputs the search results in the interactive GUI using the ranking assigned at block 610. The ranking can be used to prioritize the ordering of the buyers in the GUI. For example, higher ranked buyers can be displayed at the top of the GUI, or be given special emphasis using highlights, brighter colors, special graphics, and the like.

Figure 7:
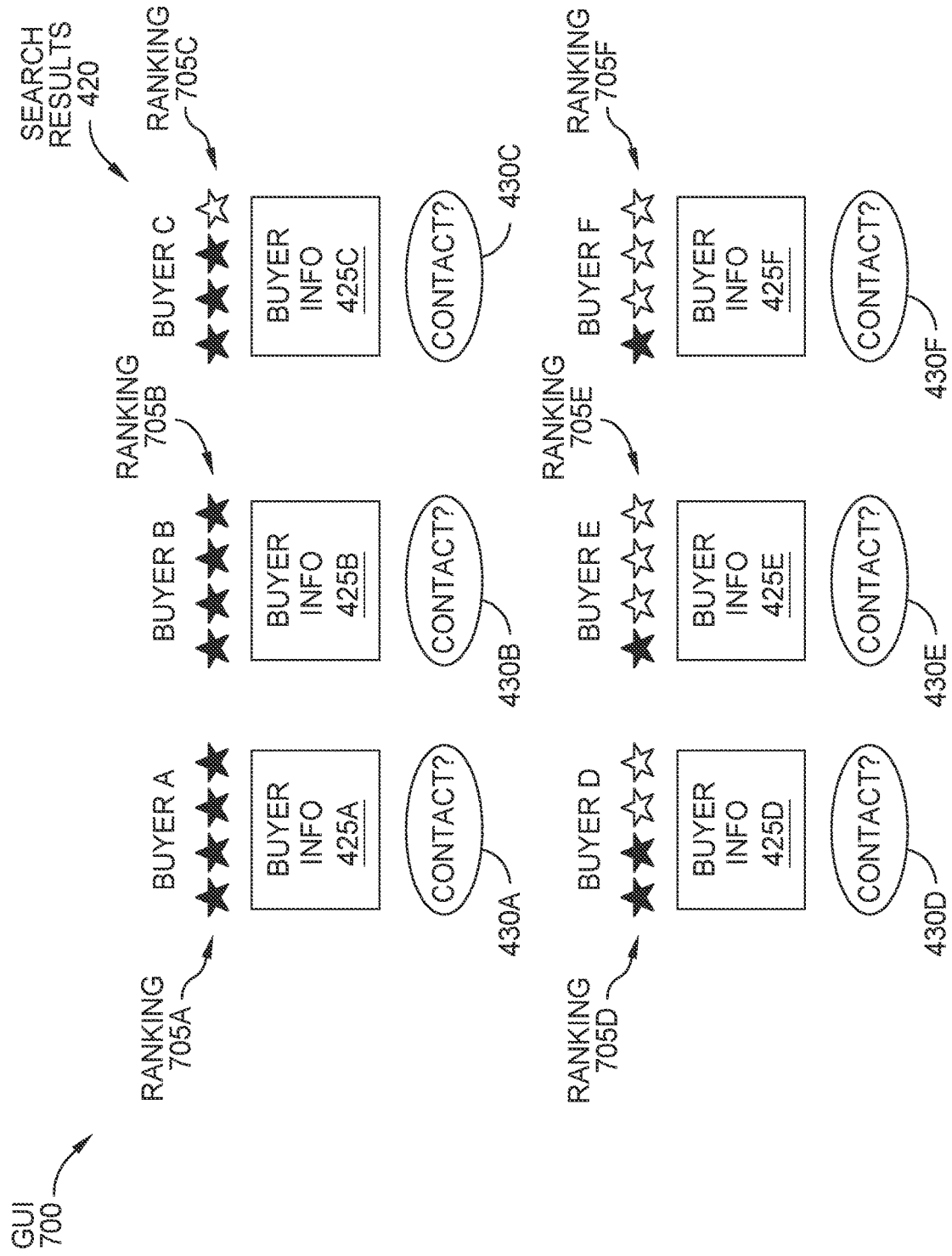
FIG. 7 is an interactive GUI with ranked search results, according one embodiment.

FIG. 7 is an interactive GUI 700 with ranked search results, according one embodiment. For ease of explanation, the GUI 700 includes the same search results 420 in the GUI 400 in FIG. 4 that display a buyer ID, buyer info 425, and buttons 430. In addition, the GUI 700 provides a ranking 705 for each buyer. In this example, the ranking 705 is illustrated graphically using a number of stars. The more stars indicates a higher ranking which in turn represents how closely the buyer profile matches the search criteria.

In this example, the ranking 705 is illustrated using a number of stars. Both Buyers A and B have four stars indicating they more closely match the search criteria. For example, the Buyers A and B may have buyer profiles that satisfy all the search criteria, or the Buyers A and B may satisfy several of the optional search criteria in addition to satisfying the required search criteria. The Buyer C has only three stars indicating it might not match the same number of search criteria as the Buyers A and B, or the Buyer C may not exactly match the search criteria (e.g., Buyer C is looking for a minimum of four bedrooms but the seller's house is a five bedroom home).

Similarly reasoning can apply to Buyers D, E, and F and why they were assigned fewer stars. For example, Buyers E and F may only match the required search criteria but not any of the optional search criteria, and thus, are assigned only one star. Nonetheless, the discussion above is just some of the examples of assigning rankings to buyers in response to their similarities with the search criteria.

Figure 8:
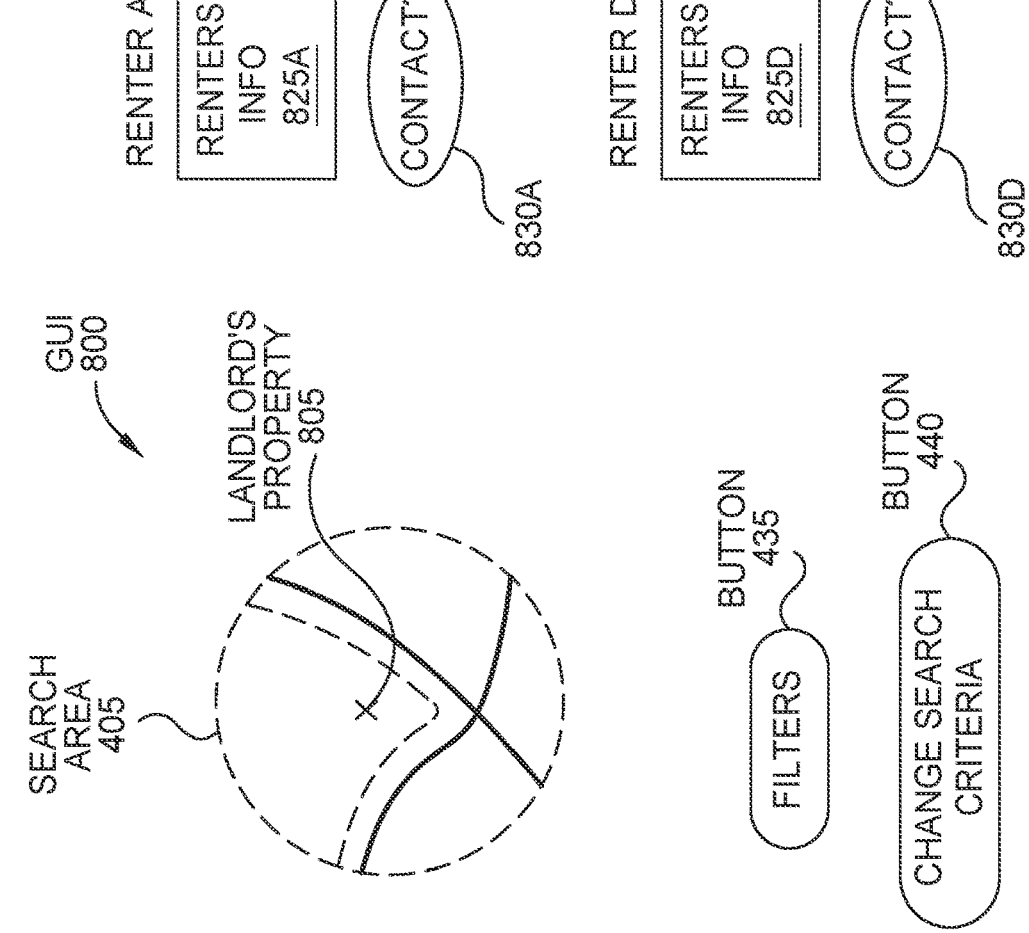
FIG. 8 is an interactive GUI for reverse rental searches, according one embodiment.

FIG. 8 is an interactive GUI 800 for reverse rental searches, according one embodiment. In one embodiment, the GUI 800 can be generated by performing the method 200 except that instead of searching for buyers, the method searches for renters. The searcher can be person who is researching the market for rentals in particular search area 405, or can be a landlord who is looking for a renter or tenant.

In GUI 800, it is assumed the searcher is a landlord who has provided a search area 405 that is a set radius from the location of the landlord's property 805. The matcher can then receive search criteria from the searcher, which in this case, can be from a landlord profile that describes the landlord's property and desired attributes of a renter (e.g., has proof of wages, particular rent range, etc.). The matcher can then generate the search results 820 that identify renters that match at least some of the search criteria. Like the sellers in FIG. 4, the landlords can be anonymous.

Further, the search results 820 can display renter info 825 which can include the number of rooms the renters want the rental to have, the specific geographic location they are looking for (which the searcher already knows at least partially overlaps with their search area 405), desired amenities (pool, gym, etc.), or types of desired leases. The search results 820 can also display the contact buttons 430 which were discussed above that the landlord can use to contact the potential renters.

In addition to the search results, the GUI 800 includes the buttons 435 and 440 which the searcher can use to filter or change the search. As discussed above, the GUI 800 is interactive so that the search can use the I/O elements like the buttons 435 and 440 to perform real-time changes to the search results 820. Thus, FIG. 8 illustrates the results of performing the method 200 to perform a reverse real estate search to identify potential renters instead of potential buyers.

Example Processing System for Improved Timeline Management

Figure 9:
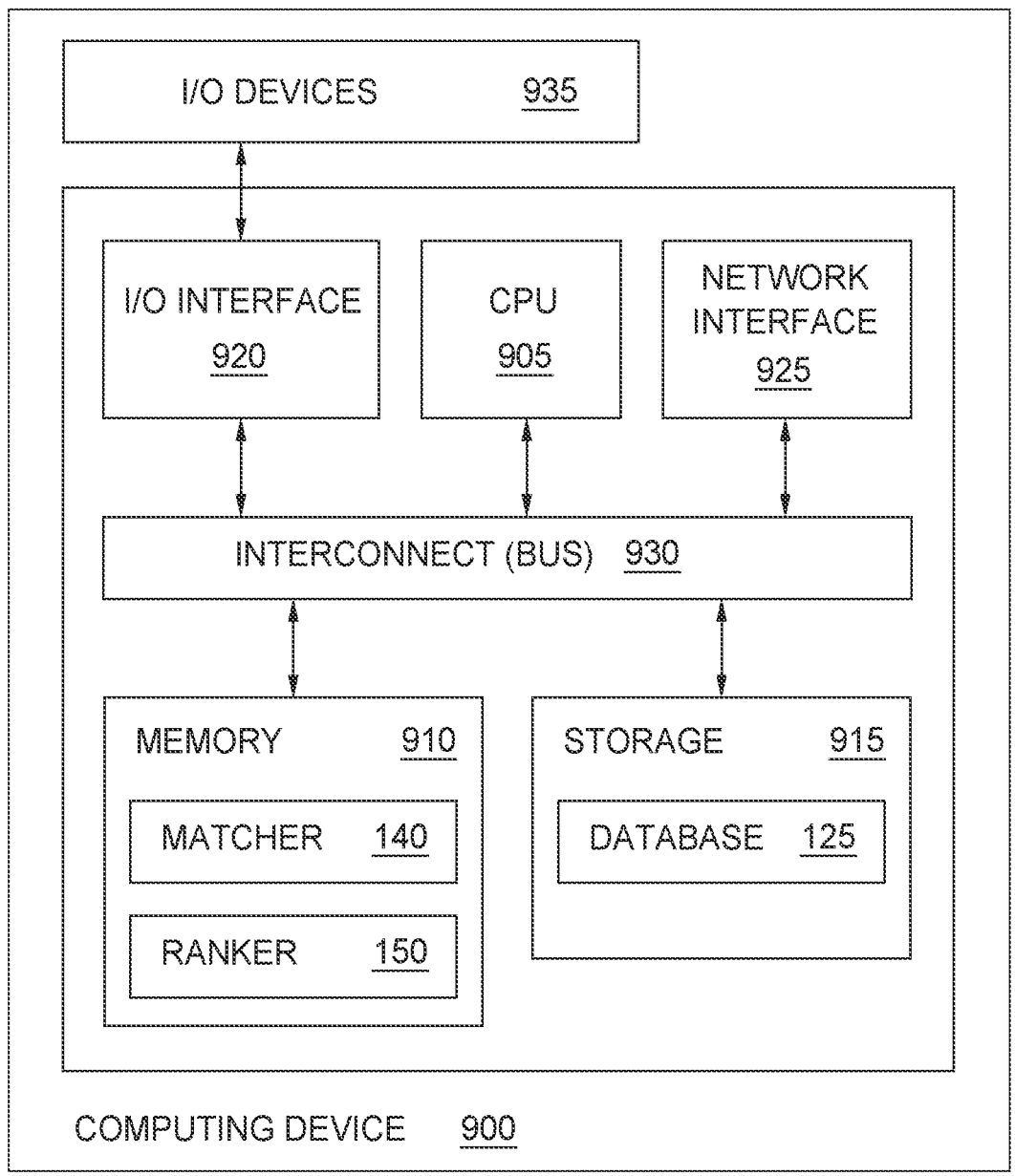
FIG. 9 depicts an example computing device configured to perform various aspects of the present disclosure.

FIG. 9 depicts an example computing device 900 configured to perform various aspects of the present disclosure. Although depicted as a physical device, in embodiments, the computing device 900 may be implemented using virtual device(s), and/or across a number of devices (e.g., in a cloud environment). In one embodiment, the computing device 900 corresponds to a computing system, such as the computing system 100 of FIG. 1.

As illustrated, the computing device 900 includes a CPU 905, memory 910, storage 915, a network interface 925, and one or more I/O interfaces 920. In the illustrated embodiment, the CPU 905 (e.g., an example of the processor 105 in FIG. 1) retrieves and executes programming instructions stored in memory 910 (e.g., the memory 110 in FIG. 1), as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated embodiment, the memory 910 includes the matcher 140 and ranker 150, which may perform one or more embodiments discussed above. Although depicted as discrete components for conceptual clarity, in embodiments, the operations of the depicted components (and others not illustrated) may be combined or distributed across any number of components. Further, although depicted as software residing in memory 910, in embodiments, the operations of the depicted components (and others not illustrated) may be implemented using hardware, software, or a combination of hardware and software.

In the illustrated example, the storage 915 includes the database 125. In one embodiment, the database 125 can store the buyer profiles and the seller profiles. The matcher 140 can then search the database 125 to identify buyers who have profiles that satisfy at least one of the search criteria. These search results can then be output using an interactive GUI that is transmitted to a user device of a searcher. Although depicted as residing in storage 915, the database 125 may be stored in any suitable location, including memory 910.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or systems (e.g., the computing system 100 of FIG. 1) or related data available in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a plurality of profiles for buyers interested in acquiring physical properties, wherein the plurality of profiles each indicate a geographic region of interest and a purchasing power of a respective buyer;
   receiving a desired sell price range from an owner of a physical property using an application programming interface (API), wherein the API prevents the owner from identifying a maximum purchasing power of one of the buyers by permitting the owner to input the desired sell price range using only a fixed list of different price ranges;
   receiving a search area from the owner of the physical property;
   determining a subset of the plurality of profiles that have geographic regions of interests that at least partially overlap the search area;
   determining which of the subset of the plurality of profiles have purchasing powers that are within the desired sell price range;
   outputting search results in an interactive graphical user interface (GUI) based on determining the subset of the plurality of profiles that have purchasing powers that are within the desired sell price range, wherein the interactive GUI comprises a filtering input/output (I/O) element enabling selection of one or more filtering options;
   receiving, after outputting the search results, selection of one or more filtering options using the filtering I/O element; and
   updating, in real-time, the search results in the interactive GUI in response to receiving the selection of the one or more filtering options by filtering the subset of the plurality of profiles that have purchasing powers that are within the desired sell price range.

2. The method of claim 1, wherein the physical property is a real physical property that is currently not listed for sale.

3. The method of claim 1, wherein receiving the plurality of profiles for the buyers is performed using application programming interfaces (APIs) in communication with user devices operated by the buyers and the owner of the physical property.

4. The method of claim 1, wherein the physical property is a hypothetical physical property used to gauge buyer interest in the search area.

5. The method of claim 1, further comprising, before outputting the search results:
   assigning rankings to the plurality of profiles that satisfy a closing requirement and have purchasing powers that are within the desired sell price range based on similarities between the plurality of profiles and the closing requirement; and assigning an order in which search results are displayed in the interactive GUI based on the rankings.

6. The method of claim 5, wherein the rankings are based on a number of search criteria that matches information in the plurality of profiles.

7. The method of claim 1, wherein the interactive GUI comprises at least one I/O element for contacting the buyers that are potentially interested in acquiring the physical property.

8. A non-transitory computer-readable storage medium comprising computer-readable program code that, when executed using one or more computer processors, performs an operation comprising:

receiving a plurality of profiles for buyers interested in acquiring physical properties, wherein the plurality of profiles each indicate a geographic region of interest and a purchasing power of a respective buyer;

receiving a desired sell price range from an owner of a physical property using an application programming interface (API), wherein the API prevents the owner from identifying a maximum purchasing power of one of the buyers by permitting the owner to input the desired sell price range using only a fixed list of different price ranges;

receiving a search area from the owner of the physical property;

determining a subset of the plurality of profiles that have geographic regions of interests that at least partially overlap the search area;

determining which of the subset of the plurality of profiles have purchasing powers that are within the desired sell price range;

outputting search results in an interactive graphical user interface (GUI) based on determining the subset of the plurality of profiles that have purchasing powers that are within the desired sell price range, wherein the interactive GUI comprises a filtering input/output (I/O) element enabling selection of one or more filtering options;

receiving, after outputting the search results, selection of one or more filtering options using the filtering I/O element; and updating, in real-time, the search results in the interactive GUI in response to receiving the selection of the one or more filtering options by filtering the subset of the plurality of profiles that have purchasing powers that are within the desired sell price range.

9. The non-transitory computer-readable storage medium of claim 8, wherein the physical property is a real physical property that is currently not listed for sale.

10. The non-transitory computer-readable storage medium of claim 8, wherein receiving the plurality of profiles for the buyers is performed using application programming interfaces (APIs) in communication with user devices operated by the buyers and the owner of the physical property.

11. The non-transitory computer-readable storage medium of claim 8, wherein the physical property is a hypothetical physical property used to gauge buyer interest in the search area.

12. The non-transitory computer-readable storage medium of claim 8, wherein the operation further comprises, before outputting the search results:

assigning rankings to the plurality of profiles that satisfy a closing requirement and have purchasing powers that are within the desired sell price range based on similarities between the plurality of profiles and the closing requirement; and assigning an order in which search results are displayed in the interactive GUI based on the rankings.

13. The non-transitory computer-readable storage medium of claim 12, wherein the rankings are based on a number of search criteria that matches information in the plurality of profiles.

14. The non-transitory computer-readable storage medium of claim 8, wherein the interactive GUI comprises at least one I/O element for contacting the buyers that are potentially interested in acquiring the physical property.

15. A system comprising:
one or more computer processors; and
logic encoded in a non-transitory medium, the logic executable by operation of the one or more computer processors to perform an operation comprising:

receiving a plurality of profiles for buyers interested in acquiring physical properties, wherein the plurality of profiles each indicate a geographic region of interest and a purchasing power of a respective buyer;

receiving a desired sell price range from an owner of a physical property using an application programming interface (API), wherein the API prevents the owner from identifying a maximum purchasing power of one of the buyers by permitting the owner to input the desired sell price range using only a fixed list of different price ranges;

receiving a search area from the owner of the physical property;

determining a subset of the plurality of profiles that have geographic regions of interests that at least partially overlap the search area;

determining which of the subset of the plurality of profiles have purchasing powers that are within the desired sell price range;

outputting search results in an interactive graphical user interface (GUI) based on determining the subset of the plurality of profiles that have purchasing powers that are within the desired sell price range, wherein the interactive GUI comprises a filtering input/output (I/O) element enabling selection of one or more filtering options;

receiving, after outputting the search results, selection of one or more filtering options using the filtering I/O element; and updating, in real-time, the search results in the interactive GUI in response to receiving the selection of the one or more filtering options by filtering the subset of the plurality of profiles that have purchasing powers that are within the desired sell price range.

16. The system of claim 15, wherein the physical property is a real physical property that is currently not listed for sale.

17. The system of claim 15, wherein receiving the plurality of profiles for the buyers is performed using application programming interfaces (APIs) in communication with user devices operated by the buyers and the owner of the physical property.

18. The system of claim 15, wherein the physical property is a hypothetical physical property used to gauge buyer interest in the search area.

19. The system of claim 15, wherein the operation further comprises, before outputting the search results:
- assigning rankings to the plurality of profiles that satisfy a closing requirement and have purchasing powers that are within the desired sell price range based on similarities between the plurality of profiles and the closing requirement; and
- assigning an order in which search results are displayed in the interactive GUI based on the rankings.

20. The system of claim 19, wherein the rankings are based on a number of search criteria that matches information in the plurality of profiles.

* * * * *